US007739061B2

(12) United States Patent
Bonnat

(10) Patent No.: US 7,739,061 B2
(45) Date of Patent: Jun. 15, 2010

(54) METHOD AND SYSTEM FOR CONTROLLING A USER INTERFACE OF A DEVICE USING HUMAN BREATH

(76) Inventor: Pierre Bonnat, 3430 E. Russel Rd., Las Vegas, NV (US) 89120

( * ) Notice: Subject to any disclaimer, the term of this patent is extended or adjusted under 35 U.S.C. 154(b) by 0 days.

(21) Appl. No.: 12/056,164

(22) Filed: Mar. 26, 2008

(65) Prior Publication Data

US 2008/0177404 A1 Jul. 24, 2008

Related U.S. Application Data

(63) Continuation-in-part of application No. 10/453,192, filed on Jun. 2, 2003, now Pat. No. 7,584,064, and a continuation of application No. 09/913,398, filed as application No. PCT/FR00/00362 on Feb. 14, 2000, now Pat. No. 6,574,571.

(30) Foreign Application Priority Data

Feb. 12, 1999 (FR) .................................. 99 01958

(51) Int. Cl.
*G01F 1/00* (2006.01)

(52) U.S. Cl. ........................................................ 702/48

(58) Field of Classification Search ................... 702/48; 128/204.26; 600/532; 180/167; 345/163
See application file for complete search history.

(56) References Cited

U.S. PATENT DOCUMENTS 4,207,959 A 6/1980 Youdin et al.
4,433,685 A 2/1984 Giorgini et al.

(Continued)

FOREIGN PATENT DOCUMENTS

JP 10320108 A * 12/1998

(Continued)

OTHER PUBLICATIONS

International Search Report and Written Opinion for International Patent Application Serial No. PCT/US09/38397, mailed May 26, 2009.

(Continued)

*Primary Examiner*—Tung S Lau
*Assistant Examiner*—Xiuquin Sun
(74) *Attorney, Agent, or Firm*—McAndrews, Held & Malloy, Ltd.

(57) ABSTRACT

Certain aspects of a method and system for controlling a user interface of a device using human breath may include detecting movement caused by expulsion of human breath by a user. In response to the detection of movement caused by expulsion of human breath, one or more control signals may be generated. The generated control signals may control the user interface of a device and may enable navigation and/or selection of components in the user interface. The generated one or more control signals may be communicated to the device being controlled via a wired and/or a wireless signal. The expulsion of the human breath may occur in open space and the detection of the movement caused by the expulsion may occur without the use of a channel. The detection of the movement and/or the generation of the control signals may be performed by a MEMS detector or sensor.

22 Claims, 15 Drawing Sheets

U.S. PATENT DOCUMENTS

| | | | | |
|---|---|---|---|---|
| 4,561,309 | A | 12/1985 | Rosner | |
| 4,713,540 | A | 12/1987 | Gilby et al. | |
| 4,746,913 | A | 5/1988 | Volta | |
| 4,929,826 | A | 5/1990 | Truchsess et al. | |
| 5,341,133 | A | 8/1994 | Savoy et al. | |
| 5,378,850 | A | 1/1995 | Tumura | |
| 5,422,640 | A | 6/1995 | Haley | |
| 5,603,065 | A | 2/1997 | Baneth | |
| 5,763,792 | A | 6/1998 | Kullik | |
| 5,870,705 | A * | 2/1999 | McAuliffe et al. | 704/225 |
| 5,889,511 | A | 3/1999 | Ong et al. | |
| 5,907,318 | A | 5/1999 | Medina | |
| 6,213,955 | B1 | 4/2001 | Karakasoglu et al. | |
| 6,261,238 | B1 | 7/2001 | Gavriely | |
| 6,396,402 | B1 | 5/2002 | Berger et al. | |
| 6,516,671 | B2 | 2/2003 | Romo et al. | |
| 6,574,571 | B1 | 6/2003 | Bonnat | |
| 6,664,786 | B2 | 12/2003 | Kretschmann | |
| 7,053,456 | B2 | 5/2006 | Matsuo | |
| 2003/0208334 | A1 | 11/2003 | Bonnat | |
| 2004/0017351 | A1 | 1/2004 | Bonnat | |
| 2005/0127154 | A1 | 6/2005 | Bonnat | |
| 2005/0268247 | A1 | 12/2005 | Baneth | |
| 2006/0118115 | A1 * | 6/2006 | Cannon | 128/204.26 |
| 2006/0142957 | A1 | 6/2006 | Bonnat | |
| 2007/0048181 | A1 | 3/2007 | Cheng et al. | |

FOREIGN PATENT DOCUMENTS

| | | |
|---|---|---|
| WO | WO 2008/030976 | 3/2008 |

OTHER PUBLICATIONS

International Search Report and Written Opinion for International Patent Application Serial No. PCT/US09/038395, mailed May 27, 2009.

International Search Report and Written Opinion for International Patent Application Serial No. PCT/US2009/038384, mailed Jun. 10, 2009.

* cited by examiner

METHOD AND SYSTEM FOR CONTROLLING A USER INTERFACE OF A DEVICE USING HUMAN BREATH

CROSS-REFERENCE TO RELATED APPLICATIONS/INCORPORATION BY REFERENCE

This application is a continuation-in-part of U.S. patent application Ser. No. 10/453,192, filed Jun. 2, 2003, which is a continuation of U.S. patent application Ser. No. 09/913,398, filed Aug. 10, 2001, now U.S. Pat. No. 6,574,571, which is a U.S. national application filed under 35 U.S.C. 371 of International Application No. PCT/FR00/00362, filed Feb. 14, 2000, which makes reference to, claims priority to, and claims the benefit of French Patent Application Serial No. 99 01958, filed Feb. 12, 1999.

This application also makes reference to:

U.S. application Ser. No. 12/055,999, filed on Mar. 26, 2008
U.S. application Ser. No. 12/056,203, filed on Mar. 26, 2008
U.S. application Ser. No. 12/056,171, filed on Mar. 26, 2008
U.S. application Ser. No. 12/056,061, filed on Mar. 26, 2008
U.S. application Ser. No. 12/056,187, filed on Mar. 26, 2008.

Each of the above referenced applications is hereby incorporated herein by reference in its entirety.

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to controlling a computer or electronic system. More specifically, certain embodiments of the invention relate to a method and system for controlling a user interface of a device using human breath.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology.

While voice connections fulfill the basic need to communicate, and mobile voice connections continue to filter even further into the fabric of every day life, the mobile access to services via the Internet has become the next step in the mobile communication revolution. Currently, most mobile devices are equipped with a user interface that allows users to access the services provided via the Internet. For example, some mobile devices may have browsers, and software and/or hardware buttons may be provided to enable navigation and/or control of the user interface. Some mobile devices such as Smartphones are equipped with touch screen capability that allows users to navigate or control the user interface via touching with one hand while the device is held in another hand.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for controlling a user interface of a device using human breath, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for controlling a user interface of a device using human breath. Exemplary aspects of the invention may comprise detecting movement caused by expulsion of human breath by a user. In response to the detection of movement caused by expulsion of human breath, one or more control signals may be generated. The generated control signals may be utilized to control the user interface of a device and may enable navigation and/or selection of components in the user interface. The generated one or more control signals may be communicated to the device being controlled via a wired and/or a wireless signal. The expulsion of the human breath may occur in open space and the detection of the movement caused by the expulsion may occur without the use of a channel. The detection of the movement and/or the generation of the control signals may be performed by a MEMS. One exemplary embodiment of a user interface is a graphical user interface (GUI).

Figure 1A:
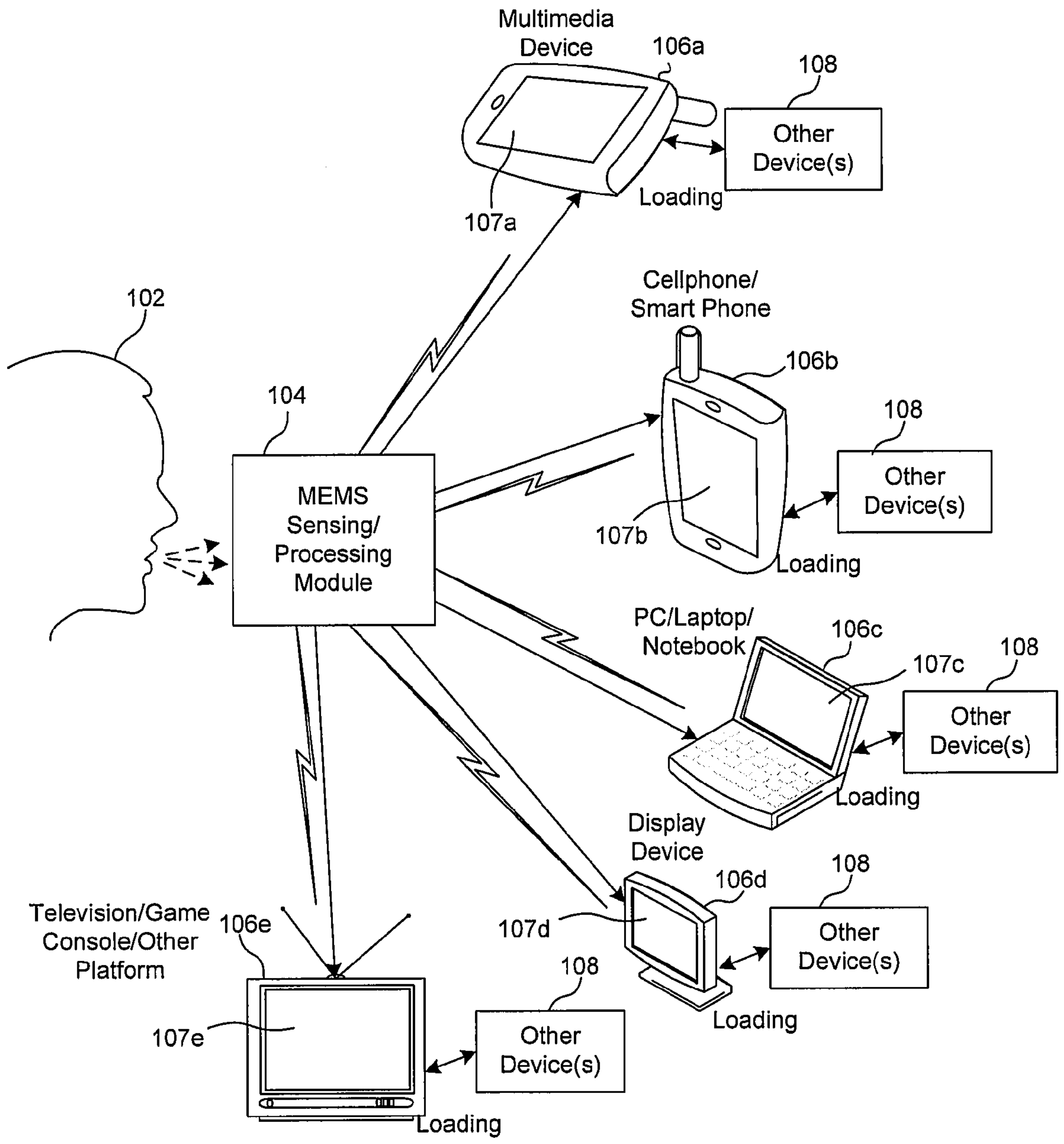
FIG. 1A is a block diagram of an exemplary system for controlling a user interface of a plurality of devices using human breath, in accordance with an embodiment of the invention.

FIG. 1A is a block diagram of an exemplary system for controlling a user interface of a plurality of devices using human breath, in accordance with an embodiment of the invention. Referring to FIG. 1A, there is shown a user 102, a micro-electro-mechanical system (MEMS) sensing and processing module 104, and a plurality of devices to be controlled, such as a multimedia device 106*a*, a cellphone/smartphone/dataphone 106*b*, a personal computer (PC), laptop or a notebook computer 106*c*, a display device 106*d* and/or a television (TV)/game console/other platform 106*e*. The multimedia device 106*a* may comprise a user interface 107*a*, the cellphone/smartphone/dataphone 106*b* may comprise a user interface 107*b*, and the personal computer (PC), laptop or a notebook computer 106*c* may comprise a user interface 107*c*. Additionally, the display device 106*d* may comprise a user interface 107*d* and the television (TV)/game console/other platform 106*e* may comprise a user interface 107*e*. Each of the plurality of devices to be controlled may be wired or wirelessly connected to a plurality of other devices 108 for loading of information via, for example, side loading, or loading via a peer-to-peer connection, and/or a network connection, and by wired and/or wireless communication. Exemplary other devices 108 may comprise game consoles, immersive or 3D reality devices, and/or telematic devices. Telematic devices refers to devices comprising integrated computing, wireless communication and/or global navigation satellite system devices, which enables sending, receiving and/or storing of information over networks. The user interface may enable interacting with the device being controlled by one or more inputs, for example, expulsion of a fluid such as air, tactual inputs such as button presses, audio actions such as voice commands, and/or movements of the electronic device 202 such as those detected by an accelerometer and/or gyroscope.

The MEMS sensing and processing module 104 may comprise suitable logic, circuitry and/or code that may be enabled to detect movement caused by expulsion of human breath by the user 102. In response to the detection of movement caused by expulsion of human breath, the MEMS sensing and processing module 104 may be enabled to generate one or more controls signals. The MEMS sensing and processing module 104 may comprise one or more segments or members that may be operable to sense the kinetic energy generated by the expulsion of the human breath and accordingly generate the one or more control signals. The generated one or more control signals may be enabled to control a user interface of one or more of a plurality of devices, such as the user interface 107*a* of the multimedia device 106*a*, the user interface 107*b* of the cellphone/smartphone/dataphone 106*b*, the user interface 107*c* of the PC, laptop or a notebook computer 106*c*, the user interface 107*d* of the display device 106*d*, the user interface 107*e* of the TV/game console/other platform 106*e*, and the user interfaces of the mobile multimedia player and/or a remote controller. One exemplary embodiment of a user interface is a graphical user interface (GUI). Any information and/or data presented on a display including programs and/or applications may be part of the user interface. U.S. application Ser. No. 12/055,999 discloses an exemplary MEMS sensing and processing module and is hereby incorporated herein by reference in its entirety.

In accordance with an embodiment of the invention, the detection of the movement caused by expulsion of human breath may occur without use of a channel. The detection of the movement caused by expulsion of human breath may be responsive to the expulsion of human breath into open space, which is then sensed.

In accordance with another embodiment of the invention, the MEMS sensing and processing module 104 may be enabled to navigate within the user interface of one of more of the plurality of devices, such as a handheld device, for example, a multimedia device 106*a*, a cellphone/smartphone/dataphone 106*b*, a PC, laptop or a notebook computer 106*c*, a display device 106*d*, and/or a TV/game console/other platform 106*e* via the generated one or more control signals. The MEMS sensing and processing module 104 may be enabled to select one or more components within the user interface of the plurality of devices via the generated one or more control signals. The generated one or more control signals may comprise one or more of a wired and/or a wireless signal.

In accordance with another embodiment of the invention, one or more of the plurality of devices, such as a handheld device, for example, a multimedia device 106*a* and/or a cellphone/smartphone/dataphone 106*b* and/or a PC, laptop or a notebook computer 106*c* may be enabled to receive one or more inputs defining the user interface from another device 108. The other device 108 may be one or more of a PC, laptop or a notebook computer 106*c* and/or a handheld device, for example, a multimedia device 106*a* and/or a cell phone/smartphone/dataphone 106*b*. In this regard, data may be transferred from the other device 108 to the cellphone/smartphone/dataphone 106*b* and this data may be associated or mapped to media content that may be remotely accessed by the cellphone/smartphone/dataphone 106*b* via a service provider such as a cellular or PCS service provider. The transferred data that is associated or mapped to media content may be utilized to customize the user interface 107*b* of the cellphone/smartphone/dataphone 106*b*. In this regard, media content associated with one or more received inputs may become an integral part of the user interface of the device being controlled. The associating and/or mapping may be performed on either the other device 108 and/or one the cellphone/smartphone/dataphone 106*b*. In instances where the associating and/or mapping is performed on the other device 108, the associated and/or mapped data may be transferred from the other device 108 to the cellphone/smartphone/dataphone 106*b*.

In an exemplary embodiment of the invention, an icon transferred from the other device 108 to the cellphone/smartphone/dataphone 106*b* may be associated or mapped to media content such as an RSS feed, a markup language such as HTML, and XML, that may be remotely accessed by the cellphone/smartphone/dataphone 106*b* via the service provider of the cellphone/smartphone 106*b*. Accordingly, when the user 102 blows on the MEMS sensing and processing module 104, control signals generated by the MEMS sensing and processing module 104 may navigate to the icon and select the icon. Once the icon is selected, the RSS feed or markup language may be accessed via the service provider of the cellphone/smartphone/dataphone 106*b* and corresponding RSS feed or markup language content may be displayed on the user interface 107*b*. U.S. application Ser. No. 12/056,187 discloses an exemplary method and system for customizing a user interface of a device and is hereby incorporated herein by reference in its entirety.

In operation, a user 102 may exhale into open space and the exhaled breath or air may be sensed by one or more detection devices or detectors, such as one or more sensors, sensing members and/or sensing segments in the MEMS sensing and processing module 104. The MEMS sensing and processing module 104 may be enabled to detect movement caused by expulsion of human breath by the user 102. One or more electrical, optical and/or magnetic signals may be generated by one or more detection devices or detectors within the MEMS sensing and processing module 104 in response to the detection of movement caused by expulsion of human breath. The processor firmware within the MEMS sensing and processing module 104 may be enabled to process the received electrical, optical and/or magnetic signals from the one or more detection device(s) or detector(s) utilizing various algorithms and generate one or more control signals to the device being controlled, for example, the multimedia device 106*a*. The generated one or more control signals may be communicated to the device being controlled, for example, the multimedia device 106*a* via a wired and/or a wireless signal. The processor in the device being controlled may utilize the communicated control signals to control the user interface of the device being controlled, such as a user interface 107*a* of the multimedia device 106*a*, a user interface 107*b* of the cellphone/smartphone/dataphone 106*b*, a user interface 107*c* of the personal computer (PC), laptop or a notebook computer 106*c*, a user interface 107*d* of the display device 106*d*, a user interface 107*e* of the TV/game console/other platform 106*e*, and a user interface of a mobile multimedia player and/or a remote controller.

Figure 1B:
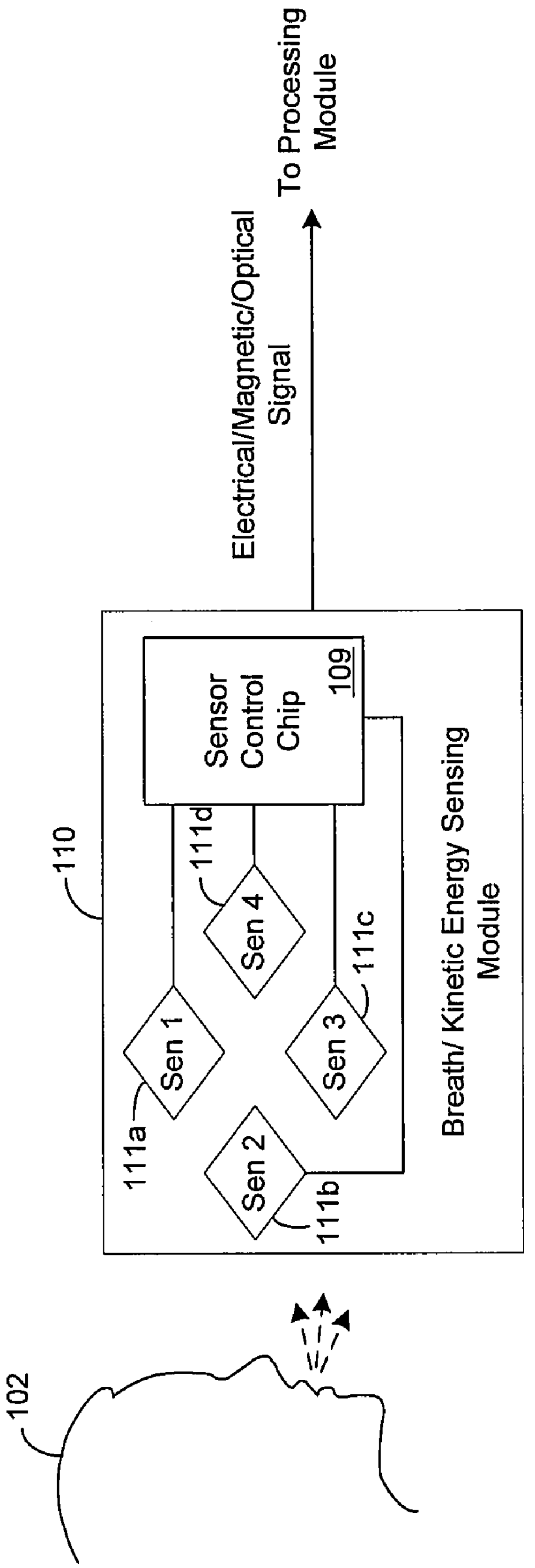
FIG. 1B is a block diagram of an exemplary sensing module to detect human breath, in accordance with an embodiment of the invention.

FIG. 1B is a block diagram of an exemplary detection device or detector to detect human breath, in accordance with an embodiment of the invention. Referring to FIG. 1B, there is shown a user 102 and a sensing module 110. The sensing module 110 may comprise a sensor control chip 109 and a plurality of sensors, for example, 111*a*, 111*b*, 111*c*, and 111*d*. Notwithstanding, the invention may not be so limited and the sensing module 110 may comprise more or less than the number of sensors or sensing members or segments shown in FIG. 1B without limiting the scope of the invention. Accordingly, any number of detectors and sources may be utilized according to the desired size, sensitivity, and resolution desired. Similarly, the type of sources and detectors may comprise other sensing mechanisms, other than visible light. For example, piezoelectric, ultrasonic, Hall effect, electrostatic, and/or permanent or electro-magnet sensors may be activated by deflected MEMS members to generate a signal to be communicated to the sensor control chip 109.

The sensing module 110 may be an electrochemical sensor or any other type of breath analyzing sensor, for example. The plurality of sensors or sensing members or segments 111*a-d* may be an integral part of one or more MEMS devices that may enable the detection of various velocities of air flow from the user's 102 breath. The plurality of sensors or sensing members or segments 111*a-d* may be enabled to detect kinetic energy and/or movement caused by the expulsion of human breath by the user 102. The sensor control chip 109 may be enabled to generate an electrical, optical and/or magnetic signal that may be communicated to the processor in response to the detection of kinetic energy and/or movement caused by expulsion of human breath.

Figure 1C:
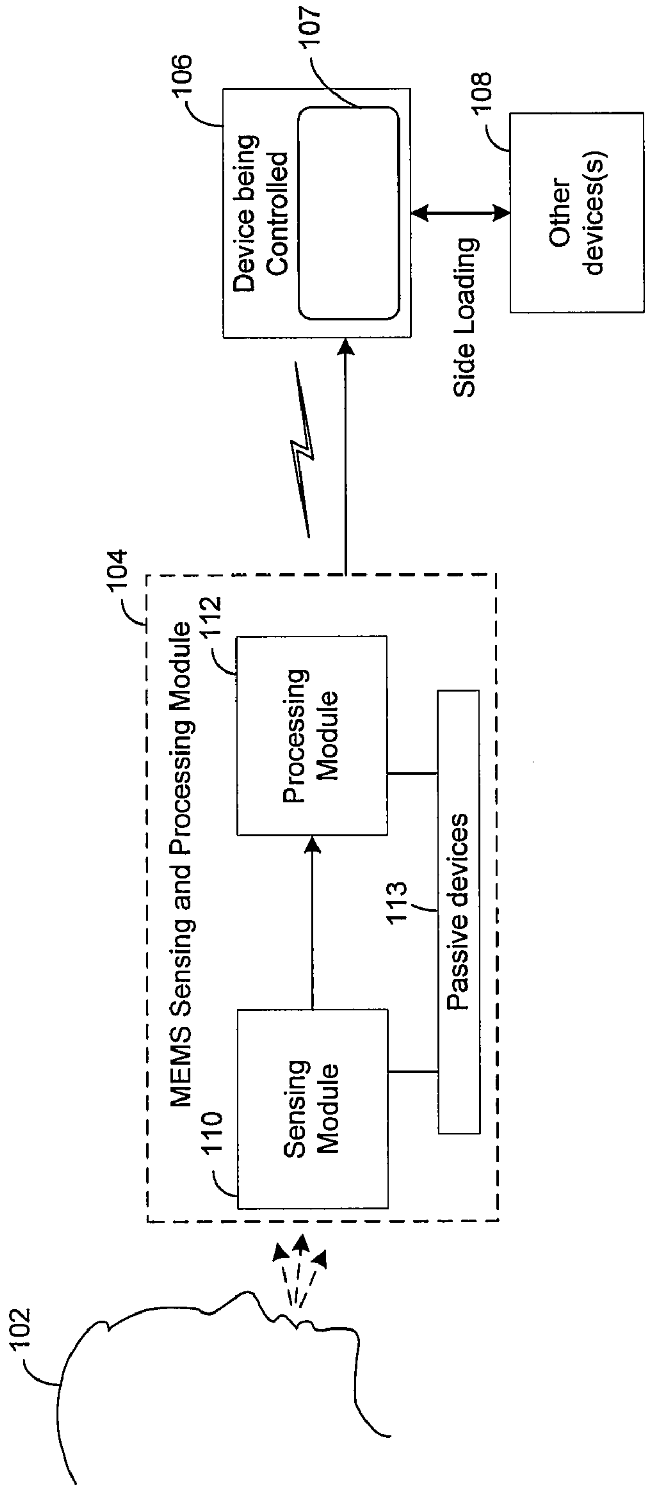
FIG. 1C is a block diagram of another embodiment of an exemplary system for controlling a user interface of a device using human breath, in accordance with an embodiment of the invention.

FIG. 1C is a block diagram of another embodiment of an exemplary system for controlling a user interface of a device using human breath, in accordance with an embodiment of the invention. Referring to FIG. 1C, there is shown a user 102, a MEMS sensing and processing module 104, and a device being controlled 106, such as a multimedia device 106*a*, a cellphone/smartphone/dataphone 106*b*, a PC, laptop or a notebook computer 106*c*, a display device 106*d* and/or a TV/game console/other platform 106*e*. The device being controlled 106 may be wired and/or wirelessly connected to a plurality of other devices 108 for side loading of information.

The MEMS sensing and processing module 104 may comprise a sensing module 110, a processing module 112 and passive devices 113. The passive devices 113, which may comprise resistors, capacitors and/or inductors, may be embedded within a substrate material of the MEMS processing sensing and processing module 104. The processing module 112 may comprise, for example, an ASIC. The sensing module 110 may generally be referred to as a detection device or detector, and may comprise one or more sensors, sensing members and/or sensing segments that may be enabled to detect kinetic energy and/or movement caused by the expulsion of human breath by the user 102. The sensing module 110 may be enabled to generate an electrical, optical and/or magnetic signal that may be communicated to the processing module 112 in response to the detection of kinetic energy and/or movement caused by expulsion of human breath.

The processing module 112 may comprise suitable logic, circuitry and/or code that may be enabled to receive the generated electric signal from the sensing module 110 and generate one or more control signals to the device being controlled 106. In this regard, the processing module 112 may comprise one or more analog to digital converters that may be enabled to translate the sensed signal to one or more digital signals, which may be utilized to generate the one or more control signals. The generated one or more control signals may be enabled to control a user interface of the device being controlled 106.

The device being controlled 106 may comprise a user interface 107. Accordingly, the generated one or more signals from the MEMS sensing and processing module 104 may be communicated to the device being controlled 106 and utilized to control the user interface 107. In an exemplary embodiment of the invention, the one or more signals generated by the MEMS sensing and processing module 104 may be operable to control a pointer on the device being controlled 106 such that items in the user interface 107 may be selected and/or manipulated. In an exemplary embodiment of the invention, the device being controlled may be enabled to receive one or more inputs from the other devices 108, which may be utilized to customize or define the user interface 107. The other device 108 may be one or more of a PC, laptop or a notebook computer 106*c* and/or a handheld device, for example, a multimedia device 106*a* and/or a cellphone/smartphone/dataphone 106*b*. In this regard, the other device 108 may be similar to or different from the type of device that is being controlled 106. In some embodiments of the invention, a processor in the other device 108 may be operable to associate or map the data to media content that is remotely accessible by the device being controlled 106. In other embodiments of the invention, a processor in the device being controlled 106 may be operable to associate or map the data to media content that is remotely accessible by the device being controlled 106. U.S. application Ser. No. 12/056,187 discloses an exemplary method and system for customizing a user interface of a device and is hereby incorporated herein by reference in its entirety.

Figure 1D:
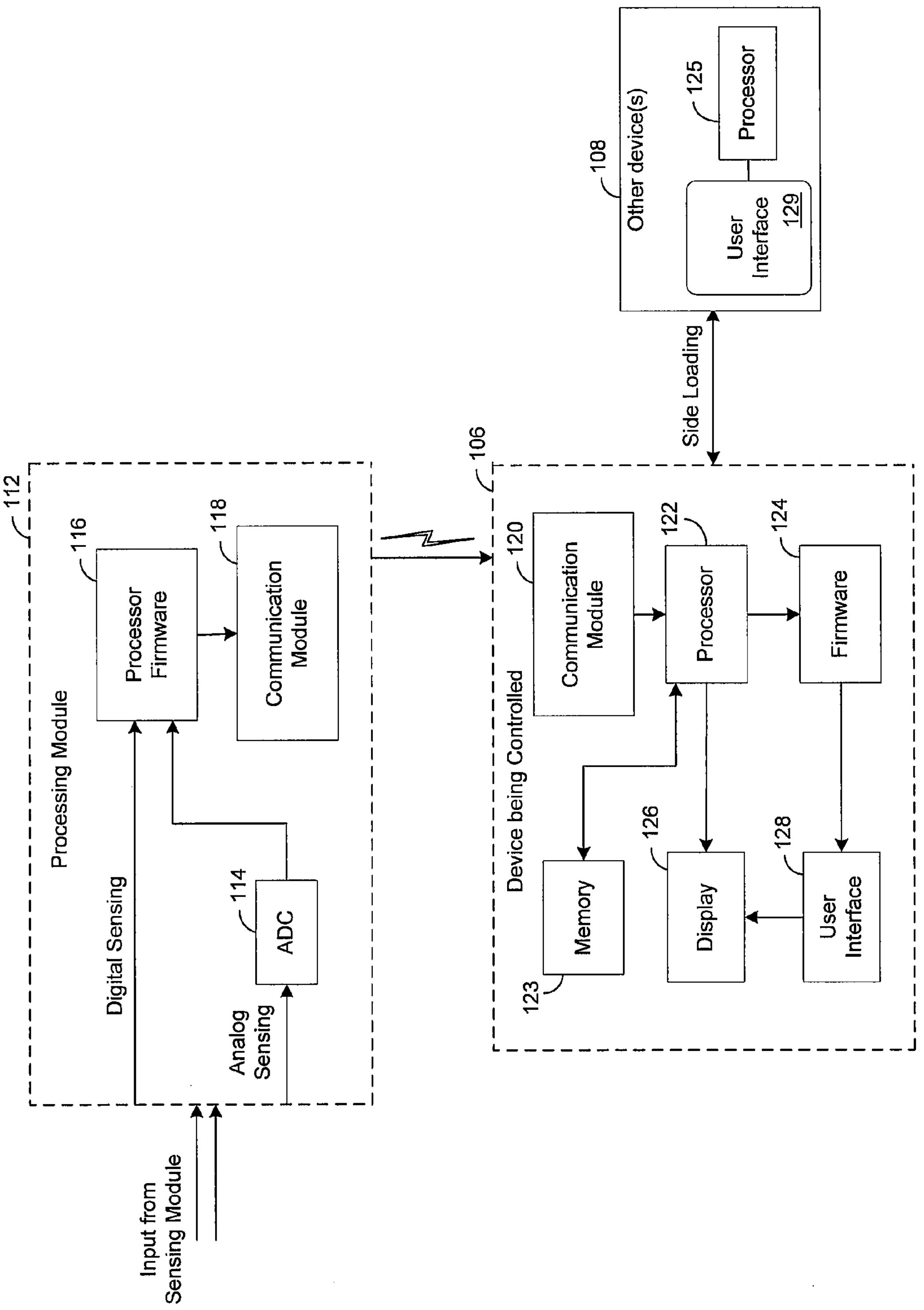
FIG. 1D is a block diagram of an exemplary processor interacting with a device being controlled, in accordance with an embodiment of the invention.

FIG. 1D is a block diagram of an exemplary processor interacting with a device being controlled, in accordance with an embodiment of the invention. Referring to FIG. 1D, there is shown a processing module 112, and a device being controlled 106 such as a multimedia device 106*a*, a cellphone/smartphone/dataphone 106*b*, a PC, laptop or a notebook computer 106*c*, a display device 106*d* and/or a TV/game console/other platform 106*e*. The processing module 112 may be an ASIC and may comprise one or more analog to digital converters (ADCs) 114, processor firmware 116, and a communication module 118. The device being controlled 106 may comprise a communication module 120, a processor 122, memory 123, firmware 124, a display 126, and a user interface 128. The device being controlled 106 may be wired and/or wirelessly connected to a plurality of other devices 108 for loading of information via, for example, side loading, or loading via a peer-to-peer connection, and/or a network connection, and by wired and/or wireless communication.

The processing module 112 may comprise suitable logic, circuitry and/or code that may be enabled to receive a digital sensing signal and/or an analog sensing signal from the sensing module 110. The ADC 114 may comprise suitable logic, circuitry and/or code that may be enabled to receive the generated analog sensing signal from the sensing module 110 and convert the received signal into a digital signal.

The processor firmware 116 may comprise suitable logic, and/or code that may be enabled to receive and process the digital signal from the ADC 114 and/or the digital sensing signal from the sensing module 110 utilizing a plurality of algorithms to generate one or more control signals. For example, the processor firmware 116 may be enabled to read, store, calibrate, filter, modelize, calculate and/or compare the outputs of the sensing module 110. The processor firmware 116 may also be enabled to incorporate artificial intelligence (AI) algorithms to adapt to a particular user's 102 breathing pattern. The processor firmware 116 may be enabled to generate one or more control signals to the device being controlled 106 based on processing the received digital signals. The generated one or more control signals may be enabled to control a user interface of the device being controlled 106, for example, scrolling, zooming, and/or 3-D navigation within the device being controlled 106.

The communication module 118 may comprise suitable logic, circuitry and/or code that may be enabled to receive and communicate the generated one or more control signals to the device being controlled 106 via a wired and/or a wireless signal. The communication modules 118 and 120 may support a plurality of interfaces. For example, the communication modules 118 and 120 may support an external memory interface, a universal asynchronous receiver transmitter (UART) interface, an enhanced serial peripheral interface (eSPI), a general purpose input/output (GPIO) interface, a pulse-code modulation (PCM) and/or an inter-IC sound ($I^2S$) interface, an inter-integrated circuit ($I^2C$) bus interface, a universal serial bus (USB) interface, a Bluetooth interface, a ZigBee interface, an IrDA interface, and/or a wireless USB (W-USB) interface.

The communication module 120 may be enabled to receive the communicated control signals via a wired and/or a wireless signal. The processor 122 may comprise suitable logic, circuitry and/or code that may be enabled to utilize the received one or more control signals to control the user interface 128 and/or the display 126. The memory may comprise suitable logic, circuitry and/or code that may be enabled to store data on the device being controlled 106. The firmware 124 may comprise a plurality of drivers and operating system (OS) libraries to convert the received control signals into functional commands. The firmware 124 may be enabled to map local functions, and convert received control signals into compatible data, such as user customization features, applets, and/or plugins to control the user interface 128.

The device being controlled 106 may be enabled to receive one or more inputs defining the user interface 128 from another device 108. The other device 108 may comprise a user interface 129 and a processor 125. The other device 108 may be one or more of a PC, laptop or a notebook computer 106*c* and/or a handheld device, for example, a multimedia device 106*a* and/or a cellphone/smartphone/dataphone 106*b*. In this regard, data may be transferred from the other device 108 to the device being controlled, such as the cellphone/smartphone/dataphone 106*b* and this data may be associated or mapped to media content that may be remotely accessed by the cellphone/smartphone/dataphone 106*b* via a service provider such as a cellular or PCS service provider. The transferred data that is associated or mapped to media content may be utilized to customize the user interface 128 of the device being controlled, such as the cellphone/smartphone/dataphone 106*b*. In this regard, media content associated with one or more received inputs may become an integral part of the user interface 128 of the device being controlled 106.

In some embodiments of the invention, the processor 125 in the other device 108 may be operable to associate or map the data to media content that is remotely accessible by the device being controlled 106. In other embodiments of the invention, the processor 122 in the device being controlled 106 may be operable to associate or map the data to media content that is remotely accessible by the device being controlled 106.

Figure 1E:
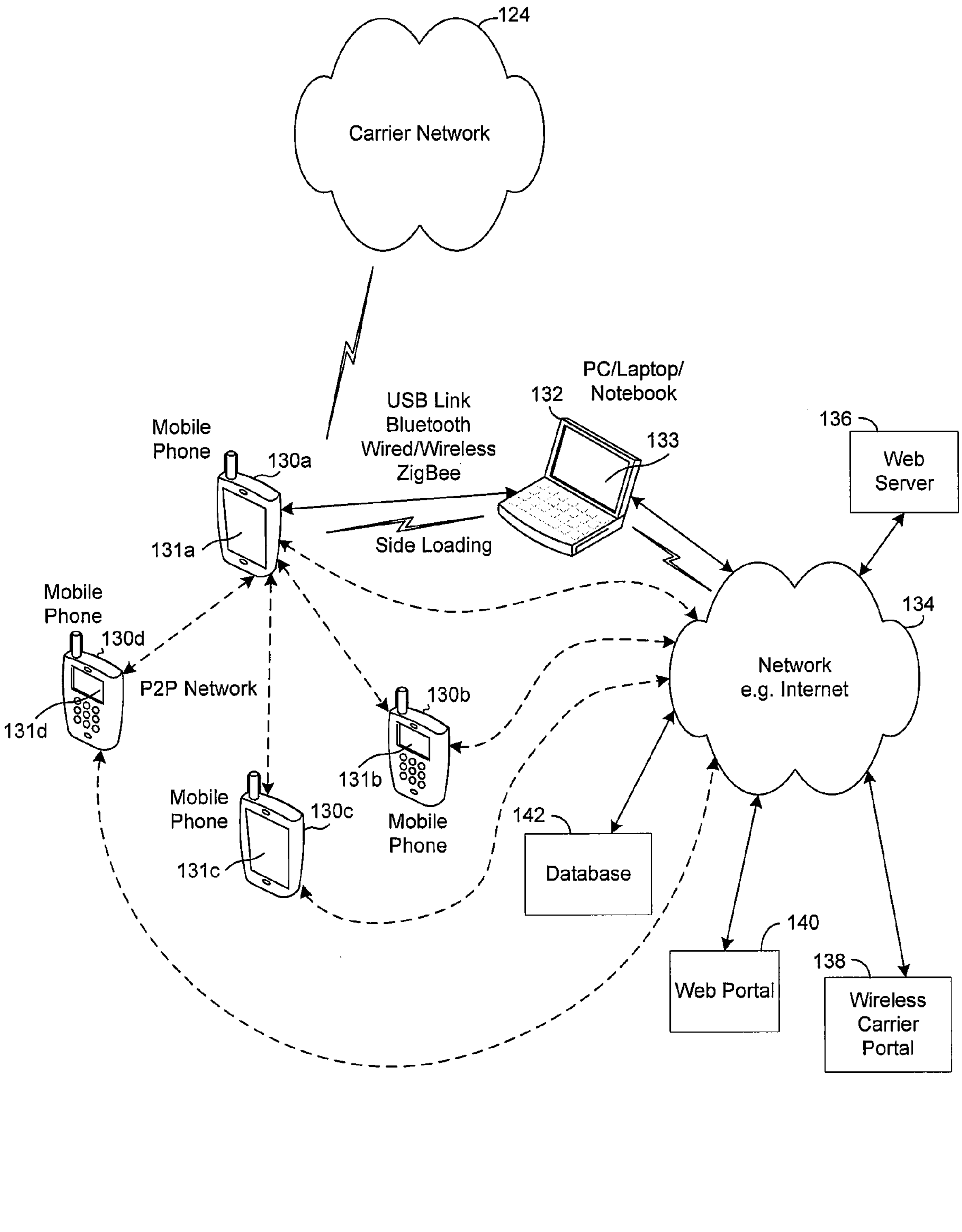
FIG. 1E is a block diagram of an exemplary system for side loading of information between two or more devices, in accordance with an embodiment of the invention.

FIG. 1E is a block diagram of an exemplary system for side loading of information between two or more devices, in accordance with an embodiment of the invention. Referring to FIG. 1E, there is shown a carrier network 124, a plurality of devices being controlled 106, such as, a plurality of mobile phones 130*a*, 130*b*, 130*c* and 130*d*, a PC, laptop or a notebook computer 132 connected to a network 134, such as the Internet. The network 134 may be coupled to a web server 136, a wireless carrier portal 138, a web portal 140 and/or a database 142. Each of the plurality of devices being controlled 106 may have a user interface. For example, the mobile phone 130*a* may have a user interface 131*a*, the mobile phone 130*b* may have a user interface 131*b*, the mobile phone 130*c* may have a user interface 131*c* and the mobile phone 130*d* may have a user interface 131*d*. The PC, laptop or a notebook computer 132 may have a user interface 133.

The carrier network 124 may be a wireless access carrier network. Exemplary carrier networks may comprise 2G, 2.5G, 3G, 4G, IEEE802.11, IEEE802.16 and/or suitable network capable of handling voice, video and/or data communication. The plurality of devices being controlled 106 may be wirelessly connected to the carrier network 124. One of the devices being controlled, such as mobile phone 130*a* may be connected to a plurality of mobile phones 130*b*, 130*c* and 130*d* via a peer-to-peer (P2P) network, for example. The device being controlled, such as mobile phone 130*a* may be communicatively coupled to a PC, laptop, or a notebook computer 132 via a wired or a wireless network. For example, the mobile phone 130*a* may be communicatively coupled to the PC, laptop, or a notebook computer 132 via an infrared (IR) link, an optical link, an USB link, a wireless USB, a Bluetooth link and/or a ZigBee link. Notwithstanding, the invention may not be so limited and other wired and/or wireless links may be utilized without limiting the scope of the invention. The PC, laptop, or a notebook computer 132 may be communicatively coupled to the network 134, for example, the Internet network 134 via a wired or a wireless network. The plurality of devices being controlled, such as the plurality of mobile phones 130*a*, 130*b*, 130*c* and 130*d* may be wirelessly connected to the Internet network 134.

The web server 136 may comprise suitable logic, circuitry, and/or code that may be enabled to receive, for example, HTTP and/or FTP requests from clients or web browsers installed on the PC, laptop, or a notebook computer 132 via the Internet network 134, and generate HTTP responses along with optional data contents, such as HTML documents and linked objects, for example.

The wireless carrier portal 138 may comprise suitable logic and/or code that may be enabled to function as a point of access to information on the Internet network 134 via a mobile device, such a mobile phone 130*a*, for example. The wireless carrier portal 138 may be, for example, a website that may be enabled to provide a single function via a mobile web page, for example.

The web portal 140 may comprise suitable logic and/or code that may be enabled to function as a point of access to information on the Internet 134. The web portal 140 may be, for example, a site that may be enabled to provide a single function via a web page or site. The web portal 140 may present information from diverse sources in a unified way such as e-mail, news, stock prices, infotainment and various other features. The database 142 may comprise suitable logic, circuitry, and/or code that may be enabled to store a structured collection of records or data, for example. The database 142 may be enabled to utilize software to organize the storage of data.

In accordance with an embodiment of the invention, the device being controlled, such as the mobile phone 130*a* may be enabled to receive one or more inputs defining a user interface 128 from another device, such as the PC, laptop, or a notebook computer 132. One or more processors 122 within the device being controlled 106 may be enabled to customize the user interface 128 of the device being controlled, such as the mobile phone 130*a* so that content associated with one or more received inputs may become an integral part of the user interface 128 of the device being controlled, such as the mobile phone 130*a*. The mobile phone 130*a* may be enabled to access content directly from the PC, laptop, or a notebook computer 132 rather than from the carrier network 124. This method of uploading and/or downloading customized information directly from the PC, laptop, or a notebook computer 132 rather than from the carrier network 124 may be referred to as side loading.

In accordance with one embodiment of the invention, the user interface 128 may be created, modified and/or organized by the user 102. In this regard, the user 102 may choose, select, create, arrange, manipulate and/or organize content to be utilized for the user interface 128 and/or one or more content components. For example, the user 102 may organize the content components on a screen and may choose content such as personal photographs for background and/or icon images. In addition, the user 102 may create and/or modify the way content components are activated or presented to the user 102. For example, the user 102 may make, import and/or edit icons and/or backgrounds for the user interface 128. Accordingly, the user 102 may associate and/or map the icon to a function so that the user 102 may enable or activate a function via the icon. Exemplary icons may enable functions such as hyper-links, book marks, programs/applications, shortcuts, widgets, RSS or markup language feeds or information, and/or favorite buddies.

In addition, the user 102 may organize and/or arrange content components within the user interface 128. For example, the icons may be organized by category into groups. Groups of icons such as content components may be referred to as affinity banks, for example. In some embodiments of the invention, the processor 125 in the other device 108 may be operable to associate or map the data to media content that is remotely accessible by the device being controlled 106. In other embodiments of the invention, the processor 122 in the device being controlled 106 may be operable to associate or map the data to media content that is remotely accessible by the device being controlled 106. For example, the processor 122 may be enabled to associate and/or map an icon to a function so that the user 102 may enable or activate a function via the icon and may organize and/or arrange content components within the user interface 128.

Creation, modification and/or organization of the user interface 128 and/or content components may be performed on the device being controlled, such as mobile phone 130*a* and/or may be performed on another device such as the PC, laptop, or a notebook computer 132. In this regard, a user screen and/or audio that may be created, modified and/or organized on another device, such as the PC, laptop, or a notebook computer 132 may be side loaded to the device being controlled, such as mobile phone 130*a*. In addition, the side loaded user interface 128 may be modified and/or organized on the device being controlled, such as mobile phone 130*a*. For example, a user interface 128 may be side loaded from the PC, laptop, or a notebook computer 132 to the mobile phone 130*a* and may be customized on the mobile phone 130*a*. One or more tools may enable creation, modification and/or organization of the user interface 128 and/or audio or visual content components.

Figure 2A:
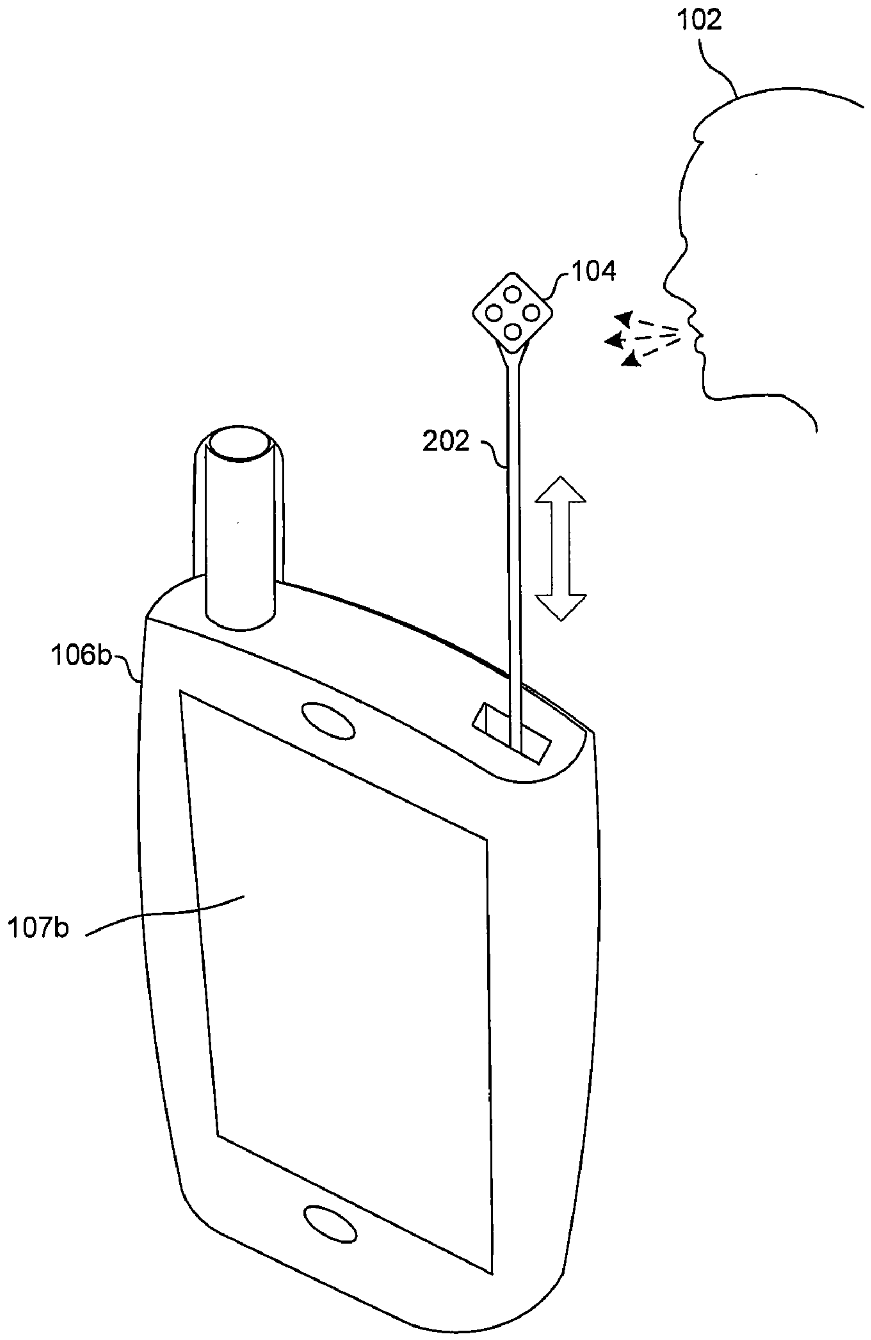
FIG. 2A is a diagram illustrating an exemplary MEMS sensing and processing module located on a stylus, in accordance with an embodiment of the invention.

FIG. 2A is a diagram illustrating an exemplary MEMS sensing and processing module located on a stylus, in accordance with an embodiment of the invention. Referring to FIG. 2A, there is shown a user 102 and a device being controlled, such as a cellphone/smartphone/dataphone 106*b*. The cellphone/smartphone/dataphone 106*b* may comprise a user interface 107*b*, and a stylus 202. The stylus 202 may be retractable, collapsible, pivotable about an axis or axes and/or flexible and may be enclosed within the body of the cellphone/smartphone/dataphone 106*b*. The stylus 202 may comprise the MEMS sensing and processing module 104 located on one end, for example. In one embodiment of the invention, the user 102 may be enabled to retract the stylus 202 and exhale into open space and onto the MEMS sensing and processing module 104.

The MEMS sensing and processing module 104 may be enabled to detect movement caused by expulsion of human breath by the user 102. In response to the detection of movement caused by expulsion of human breath, the MEMS sensing and processing module 104 may be enabled to generate one or more controls signals. The MEMS sensing and processing module 104 may comprise one or more segments or members that may be operable to sense the kinetic energy generated by the expulsion of the human breath and accordingly generate the one or more control signals. The generated one or more control signals may be enabled to control a user interface 107*b* of the cellphone/smartphone/dataphone 106*b*.

Figure 2B:
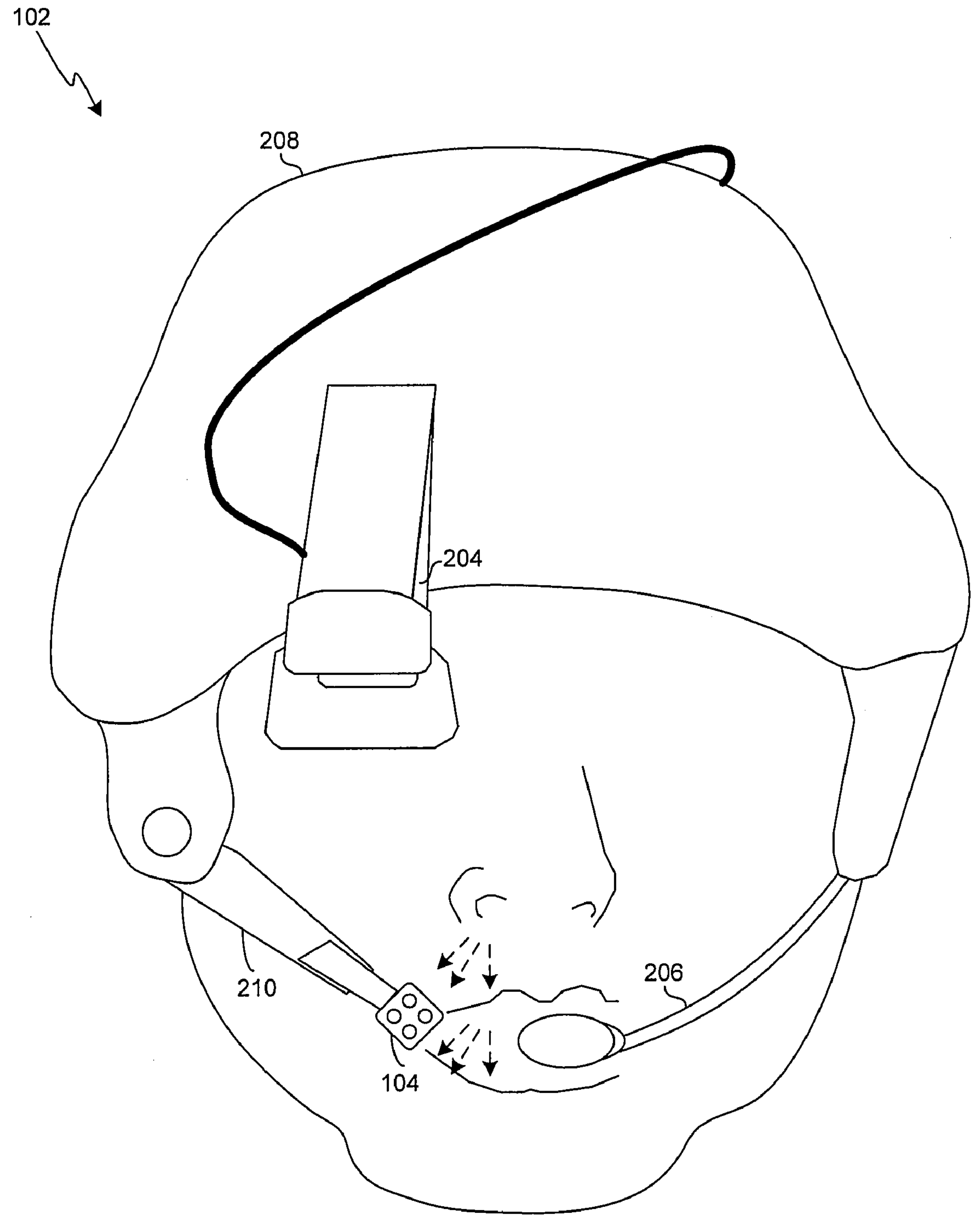
FIG. 2B is a diagram illustrating an exemplary MEMS sensing and processing module located on a headset for military personnel, in accordance with an embodiment of the invention.

FIG. 2B is a diagram illustrating an exemplary MEMS sensing and processing module located on a headset for military personnel, in accordance with an embodiment of the invention. Referring to FIG. 2B, there is shown a user 102.

The user 102 may wear a detachable helmet 208. The detachable helmet 208 may comprise detachable eyewear 204, a detachable microphone 206, and a detachable headset 210. The detachable headset 210 may comprise the MEMS sensing and processing module 104 located on one end, for example.

The detachable eyewear 204 may comprise night vision and/or infrared vision capabilities, for example. The detachable microphone 206 may be utilized to communicate with other users, for example. In one embodiment of the invention, the user 102 may be enabled to exhale into open space and the MEMS sensing and processing module 104 may be operable to sense or detect the exhalation. The exhalation may occur from the nostrils and/or the mouth of the user 102.

The MEMS sensing and processing module 104 may be enabled to detect movement caused by expulsion of human breath by the user 102. In response to the detection of movement caused by expulsion of human breath, the MEMS sensing and processing module 104 may be enabled to generate one or more controls signals. The generated one or more control signals may be enabled to control a user interface of the device being controlled such as a user interface 107*a* of the multimedia device 106*a*, a user interface 107*b* of the cellphone/smartphone/dataphone 106*b*, a user interface 107*c* of the personal computer (PC), laptop or a notebook computer 106*c* and/or a user interface 107*d* of the display device 106*d*.

Figure 2C:
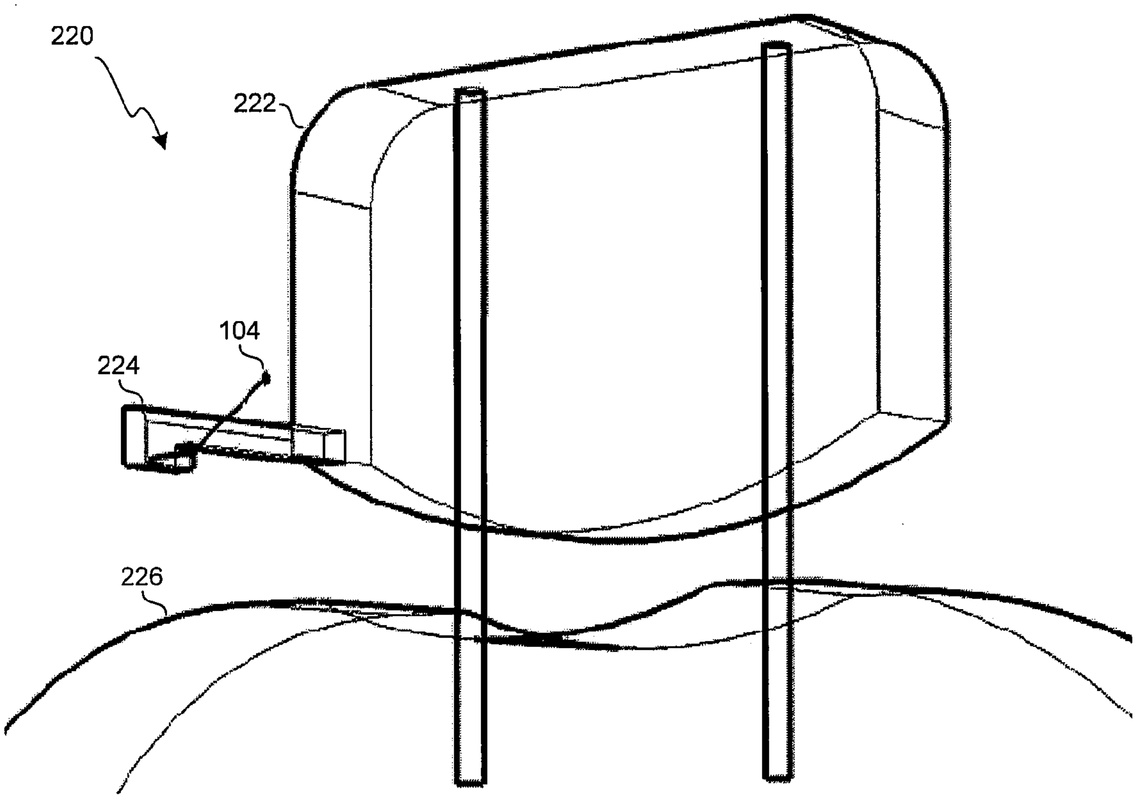
FIG. 2C is a diagram illustrating an exemplary MEMS sensing and processing module located on a headrest of a seating apparatus, in accordance with an embodiment of the invention.

FIG. 2C is a diagram illustrating an exemplary MEMS sensing and processing module located on a headrest of a seating apparatus, in accordance with an embodiment of the invention. Referring to FIG. 2C, there is shown a seating apparatus 220. The seating apparatus 220 may comprise a headrest 222, a backrest 226. The headrest 222 may comprise a detachable headset 224. The user 102 may be enabled to sit in the seating apparatus 220.

The detachable headset 224 may comprise the MEMS sensing and processing module 104 located on one end, for example. In one embodiment of the invention, the user 102 may be enabled to exhale into open space and onto the MEMS sensing and processing module 104. In one embodiment, the seating apparatus 220 may be located inside a car or any other automobile or vehicle, for example. Notwithstanding, the invention may not be so limited and the MEMS sensing and processing module 104 may be located at other locations without limiting the scope of the invention.

The MEMS sensing and processing module 104 may be enabled to detect movement caused by expulsion of human breath by the user 102 seated in the seating apparatus 102. In response to the detection of movement caused by expulsion of human breath, the MEMS sensing and processing module 104 may be enabled to generate one or more controls signals. The generated one or more control signals may be enabled to control a user interface of the device being controlled such as a user interface 107*a* of the multimedia device 106*a*, a user interface 107*b* of the cellphone/smartphone/dataphone 106*b*, a user interface 107*c* of the personal computer (PC), laptop or a notebook computer 106*c*, a user interface 107*d* of the display device 106*d*, and/or the user interface of a multimedia player, such as a audio and/or video player.

Figure 2D:
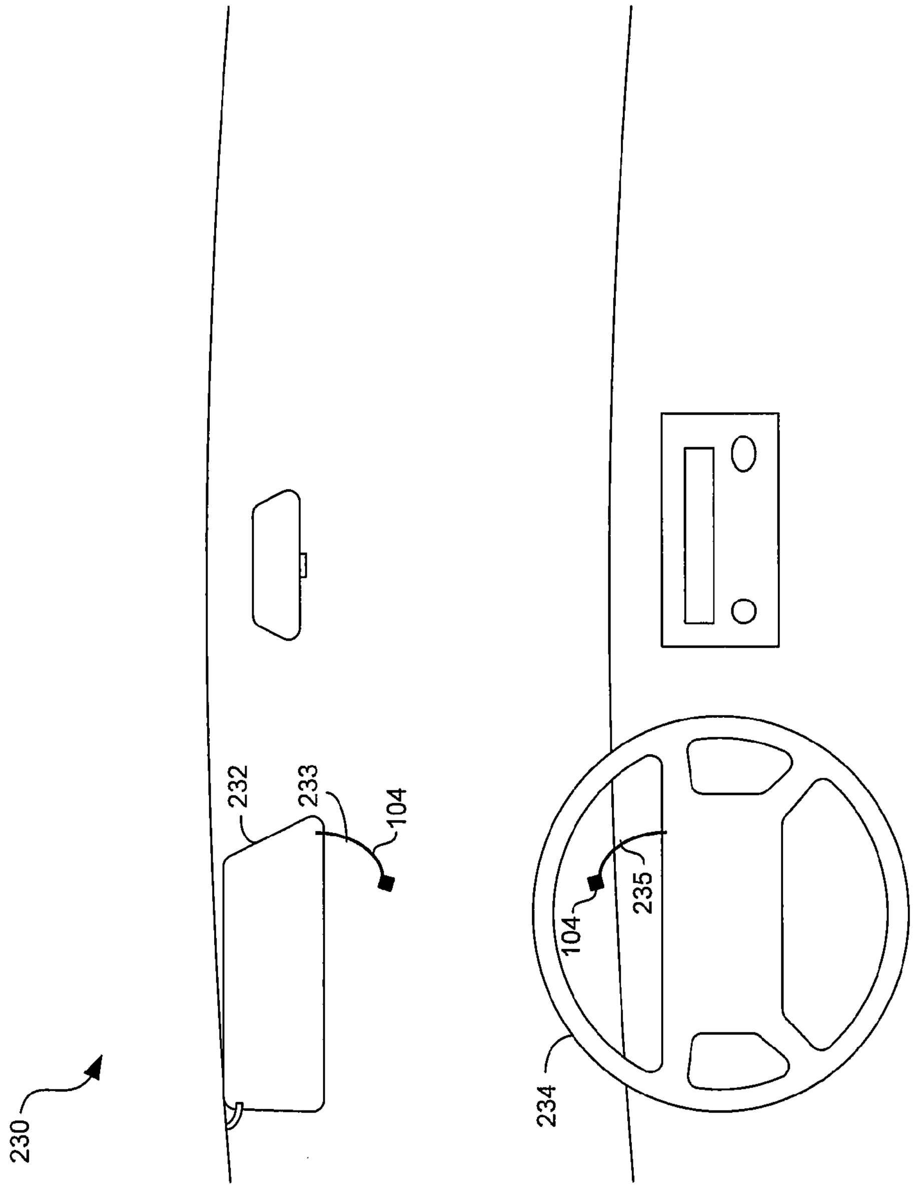
FIG. 2D is a diagram illustrating an exemplary MEMS sensing and processing module located inside an automobile, in accordance with an embodiment of the invention.

FIG. 2D is a diagram illustrating an exemplary MEMS sensing and processing module located inside an automobile, in accordance with an embodiment of the invention. Referring to FIG. 2D, there is shown an automobile 230. The automobile 230 may comprise a visor 232 and a steering wheel 234.

In one embodiment of the invention, the visor 232 may comprise a flexible support structure 233. The support structure 233 may comprise the MEMS sensing and processing module 104 located on one end, for example. In another embodiment of the invention, the steering wheel 234 may comprise a flexible support structure 235. The support structure 235 may comprise the MEMS sensing and processing module 104 located on one end, for example. Notwithstanding, the invention may not be so limited and the MEMS sensing and processing module 104 may be located at other locations within the automobile 230 without limiting the scope of the invention.

For example and without limitation, the user 102 may be seated in the seat behind the steering wheel 234, with the processing module 104 mounted on the steering wheel 234. The user 102 may be seated in the seat behind the steering wheel 234. The user 102 may be enabled to exhale into open space and onto the MEMS sensing and processing module 104. The MEMS sensing and processing module 104 may be enabled to detect movement caused by expulsion of human breath by the user 102. In response to the detection of movement caused by expulsion of human breath, the MEMS sensing and processing module 104 may be enabled to generate one or more controls signals to control a user interface of the device being controlled such as a user interface 107*a* of the multimedia device 106*a*, a user interface 107*b* of the cellphone/smartphone/dataphone 106*b*, a user interface 107*c* of the personal computer (PC), laptop or a notebook computer 106*c*, a user interface 107*d* of the display device 106*d*, and/or the user interface of a multimedia or other device, such as a audio and/or video player or a navigation (e.g., GPS) device.

Figure 2E:
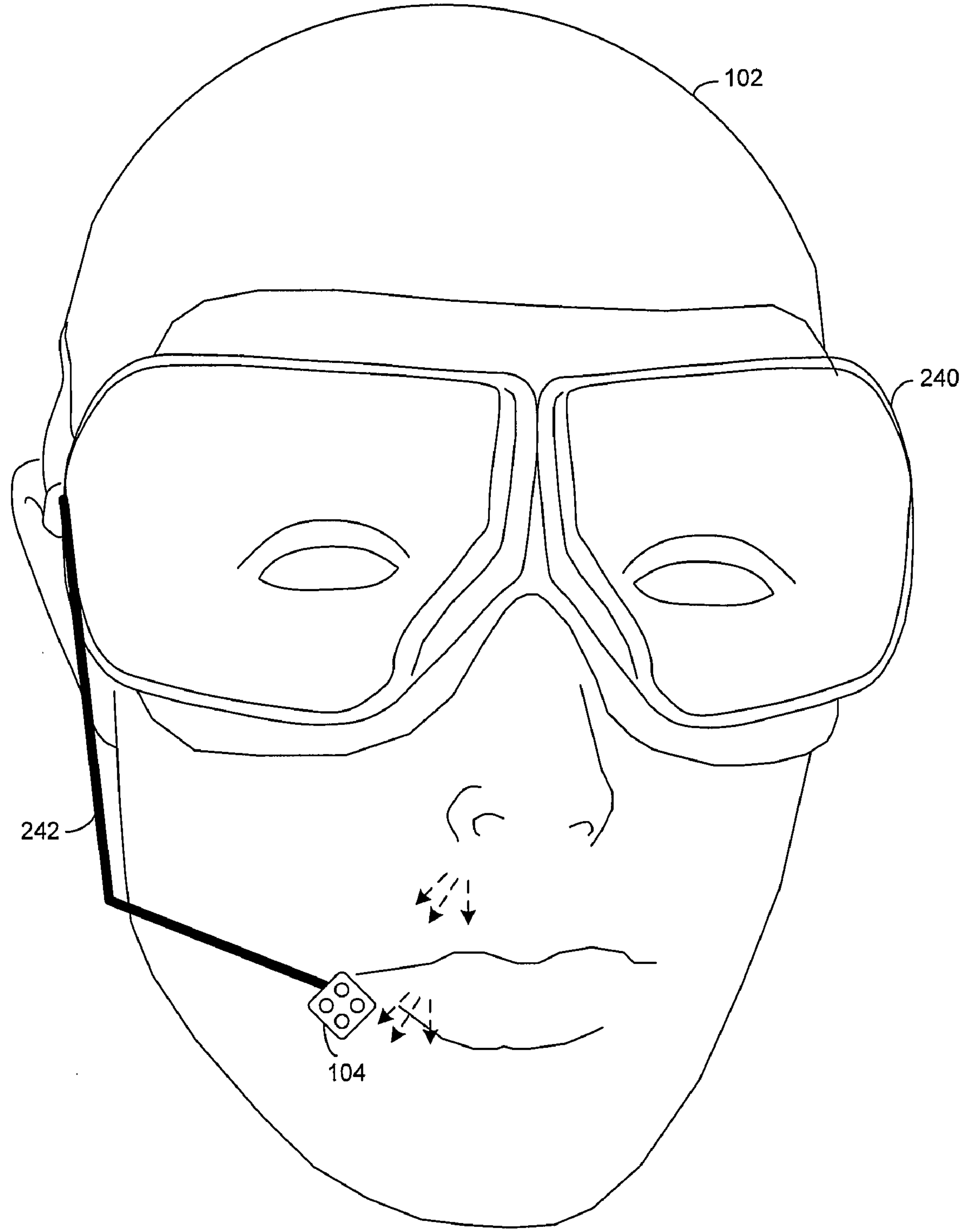
FIG. 2E is a diagram illustrating an exemplary MEMS sensing and processing module located on detachable eyewear, in accordance with an embodiment of the invention.

FIG. 2E is a diagram illustrating an exemplary MEMS sensing and processing module located on detachable eyewear, in accordance with an embodiment of the invention. Referring to FIG. 2E, there is shown a user 102. The user 102 may wear detachable goggles or any other type of eyewear 240, for example. The detachable eyewear 240 may comprise a detachable headset 242. The detachable headset 242 may be flexible and/or deflectable. The detachable headset 242 may comprise the MEMS sensing and processing module 104 located on one end, for example. In one embodiment of the invention, the user 102 may be enabled to exhale into open space and onto the MEMS sensing and processing module 104.

The MEMS sensing and processing module 104 may be enabled to detect movement caused by expulsion of human breath by the user 102 seated in the seating apparatus 102. In response to the detection of movement caused by expulsion of human breath, the MEMS sensing and processing module 104 may be enabled to generate one or more controls signals to control a user interface of the device being controlled such as a user interface 107*a* of the multimedia device 106*a*, a user interface 107*b* of the cellphone/smartphone/dataphone 106*b*, a user interface 107*c* of the personal computer (PC), laptop or a notebook computer 106*c*, a user interface 107*d* of the display device 106*d*, and/or the user interface of a multimedia player, such as a audio and/or video player.

Figure 2F:
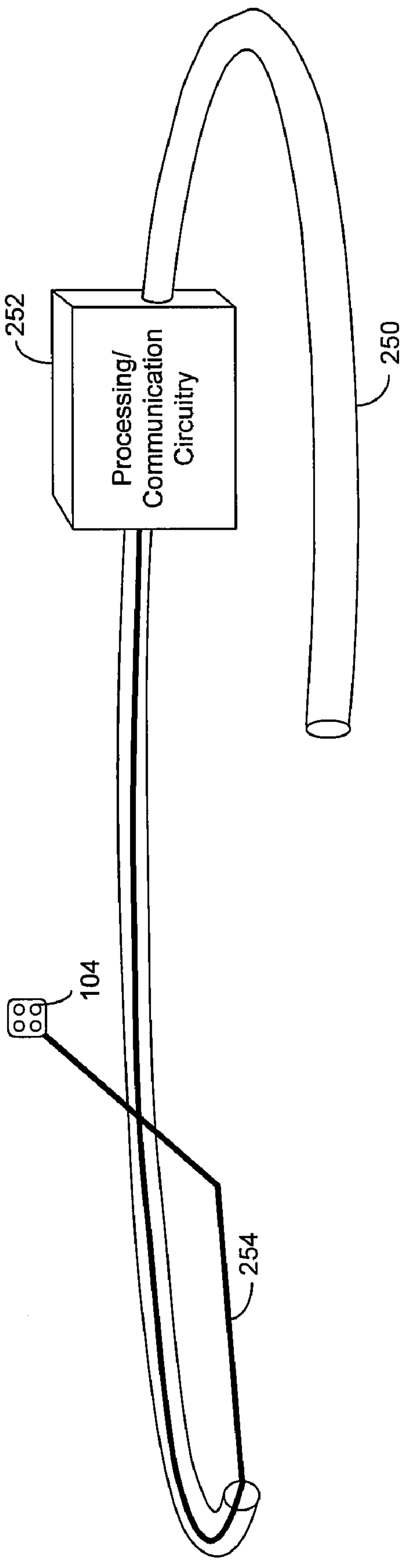
FIG. 2F is a diagram illustrating an exemplary MEMS sensing and processing module located on a neckset, in accordance with an embodiment of the invention.

FIG. 2F is a diagram illustrating an exemplary MEMS sensing and processing module located on a neckset, in accordance with an embodiment of the invention. Referring to FIG. 2F, there is shown a detachable neckset 250. The detachable neckset 250 may comprise a flexible printed circuit board (PCB) 254 and processing and/or communication circuitry 252. The flexible PCB 254 may comprise the MEMS sensing and processing module 104 located on one end, for example.

The processing and/or communication circuitry 252 may comprise a battery, a voltage regulator, one or more switches, one or more light emitting diodes (LEDs), a liquid crystal display (LCD), other passive devices such as resistors, capacitors, inductors, a communications chip capable of handling one or more wireless communication protocols such as Bluetooth and/or one or more wired interfaces. In an exemplary embodiment of the invention, the processing and/or communication circuitry 252 may be packaged within a PCB. Notwithstanding, the invention may not be so limited and the processing and/or communication circuitry 252 may comprise other components and circuits without limiting the scope of the invention.

In one embodiment of the invention, the user 102 may be enabled to wear the neckset 250 around his/her neck and exhale into open space and the MEMS sensing and processing module 104 may be operable to sense or detect the exhalation. The exhalation may occur from the nostrils and/or the mouth of the user 102.

The MEMS sensing and processing module 104 may be enabled to detect movement caused by expulsion of human breath by the user 102. In response to the detection of movement caused by expulsion of human breath, the MEMS sensing and processing module 104 may be enabled to generate one or more controls signals via the flexible PCB 254 to the processing and/or communication circuitry 252. The processing and/or communication circuitry 252 may be enabled to process and communicate the generated one or more control signals to a device being controlled, such as a multimedia device 106*a*, a cellphone/smartphone/dataphone 106*b*, a personal computer (PC), laptop or a notebook computer 106*c* and/or a display device 106*d*. On or more processors within the device being controlled may be enabled to utilize the communicate control signals to control a user interface of the device being controlled such as a user interface 107*a* of the multimedia device 106*a*, a user interface 107*b* of the cellphone/smartphone/dataphone 106*b*, a user interface 107*c* of the personal computer (PC), laptop or a notebook computer 106*c* and/or a user interface 107*d* of the display device 106*d*.

Figure 2G:
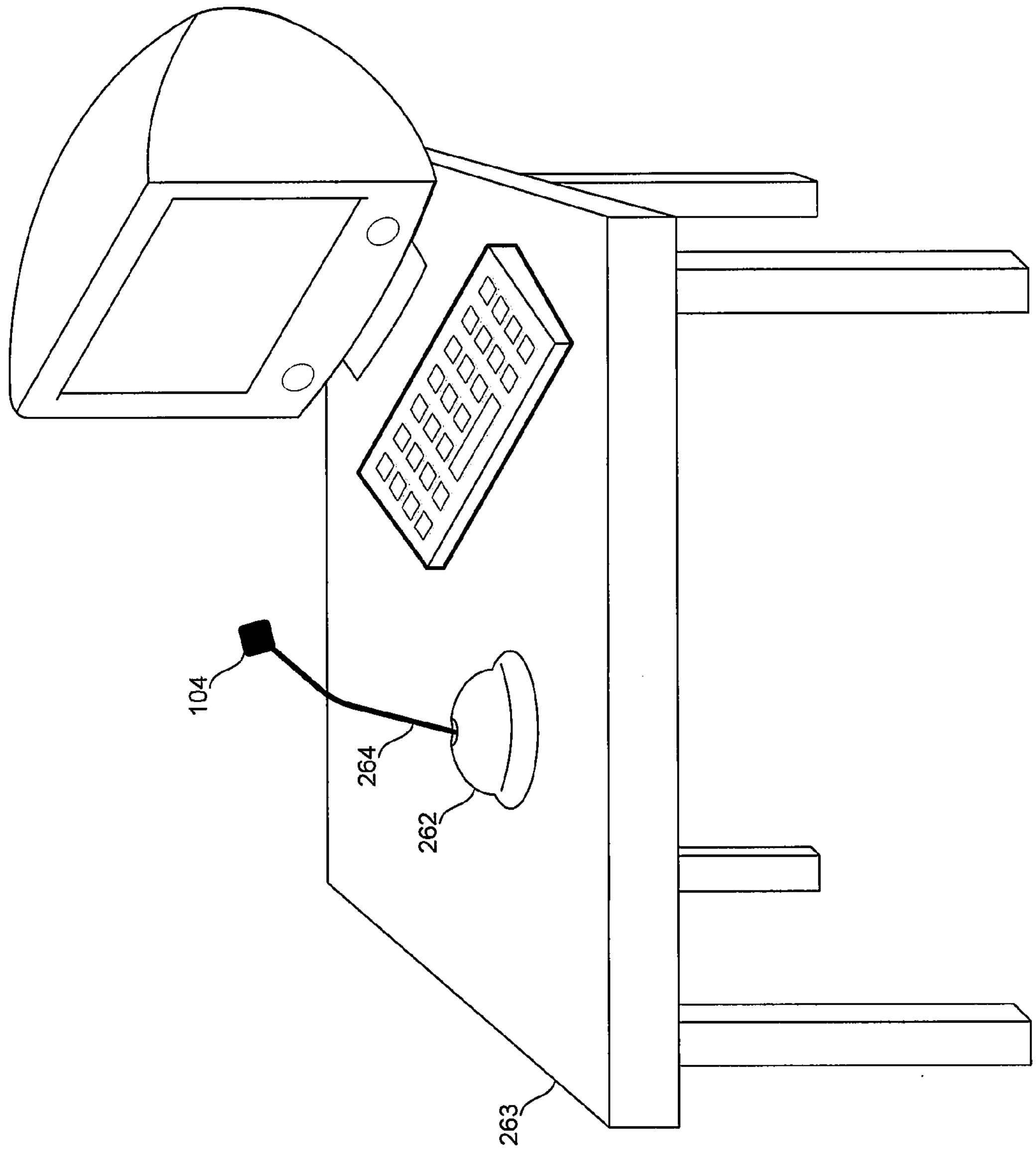
FIG. 2G is a diagram illustrating an exemplary MEMS sensing and processing module located on a stand alone device, in accordance with an embodiment of the invention.

FIG. 2G is a diagram illustrating an exemplary MEMS sensing and processing module located on a stand alone device, in accordance with an embodiment of the invention. Referring to FIG. 2G, there is shown a stand alone device 262. The stand alone device 262 may be placed on any suitable surface, for example, on a table or desk top 263. The stand alone device 262 may comprise a flexible support structure 264. The support structure 264 may comprise the MEMS sensing and processing module 104 located on one end, for example. Notwithstanding, the invention may not be so limited and the MEMS sensing and processing module 104 may be located at other locations on the stand alone device 262, for example in a base of the stand alone device 262. Notwithstanding, the invention may not be limited in this regard, and the location of the MEMS sensing and processing module 104 within or on the stand alone device 262 may vary accordingly.

The MEMS sensing and processing module 104 may be enabled to detect movement caused by the expulsion of human breath by the user 102. In response to the detection of movement caused by expulsion of a fluid such as air from human breath, the MEMS sensing and processing module 104 may be enabled to generate one or more controls signals. The MEMS sensing and processing module 104 may comprise one or more segments or members that may be operable to sense the kinetic energy generated by the expulsion of the human breath and accordingly generate the one or more control signals. The generated one or more control signals may be enabled to control a user interface 107*b* of the cellphone/smartphone/dataphone 106*b*.

Figure 2H:
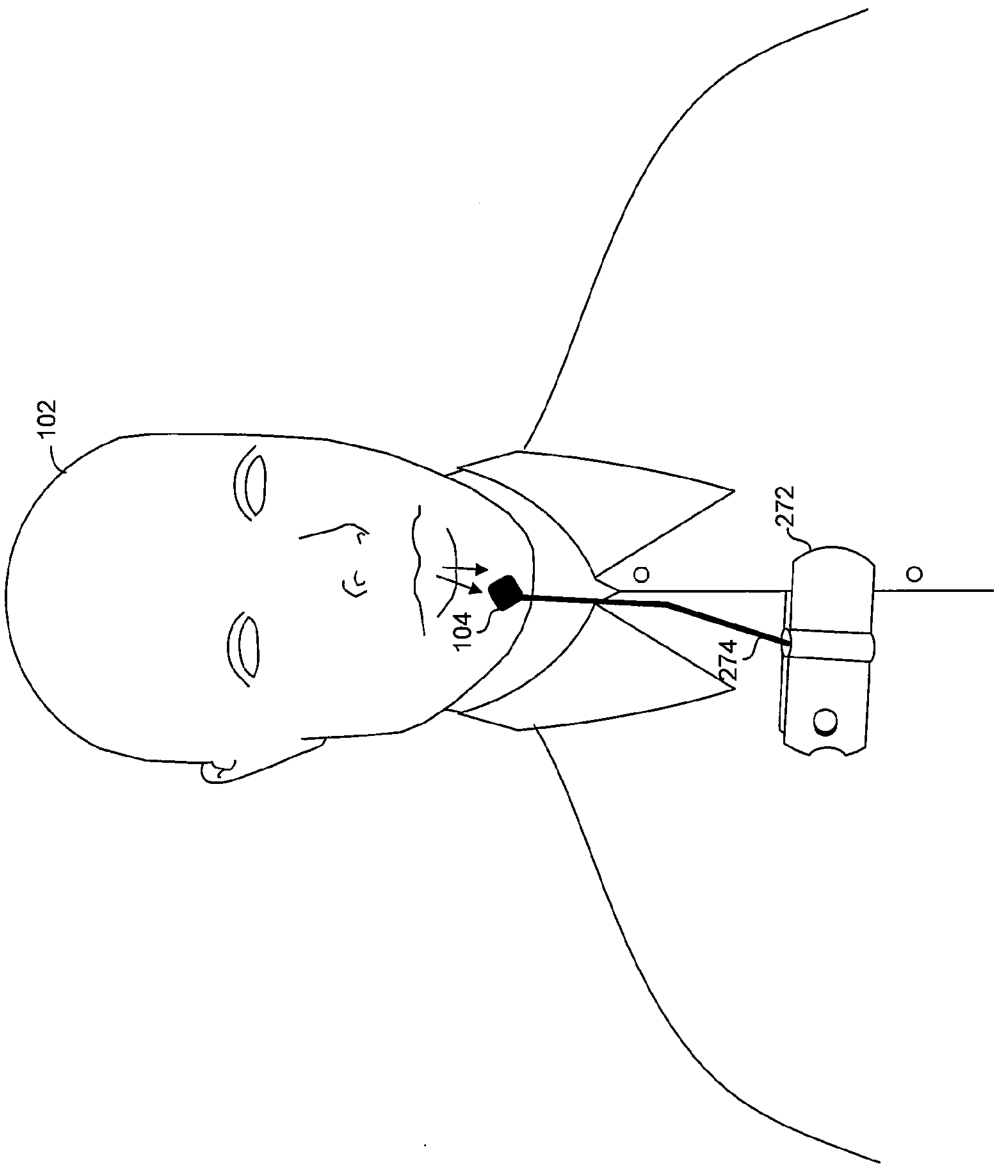
FIG. 2H is a diagram illustrating an exemplary MEMS sensing and processing module located on a clip, in accordance with an embodiment of the invention.

FIG. 2H is a diagram illustrating an exemplary MEMS sensing and processing module located on a clip, in accordance with an embodiment of the invention. Referring to FIG. 2H, there is shown a user 102 and a clip 272. The clip 272 may be placed on any suitable piece of clothing, for example, on a collar of a shirt, a lapel of a coat or a pocket. The clip 272 may comprise a flexible support structure 274, for example. Although a clip 272 is illustrated, other suitable attachment structure may be utilized to affix the support structure 274. The support structure 274 may comprise the MEMS sensing and processing module 104, the latter of which may be located on one end of or anywhere on the support structure 274, for example. Notwithstanding, the invention may not be so limited and the MEMS sensing and processing module 104 may be placed at other locations on the outerwear or innerwear of the user 102 without limiting the scope of the invention. In other exemplary embodiments of the invention, the support structure 274 may not be utilized and the MEMS sensing and processing module 104 may be attached to the clip 272 or other suitable attachment structure.

The MEMS sensing and processing module 104 may be enabled to detect movement caused by the expulsion of human breath by the user 102. In response to the detection of movement caused by expulsion of human breath, the MEMS sensing and processing module 104 may be enabled to generate one or more controls signals. The MEMS sensing and processing module 104 may comprise one or more segments or members that may be operable to sense the kinetic energy generated by the expulsion of the human breath and accordingly generate the one or more control signals. The generated one or more control signals may be enabled to control a user interface 107*b* of the cellphone/smartphone/dataphone 106*b*.

Figure 3A:
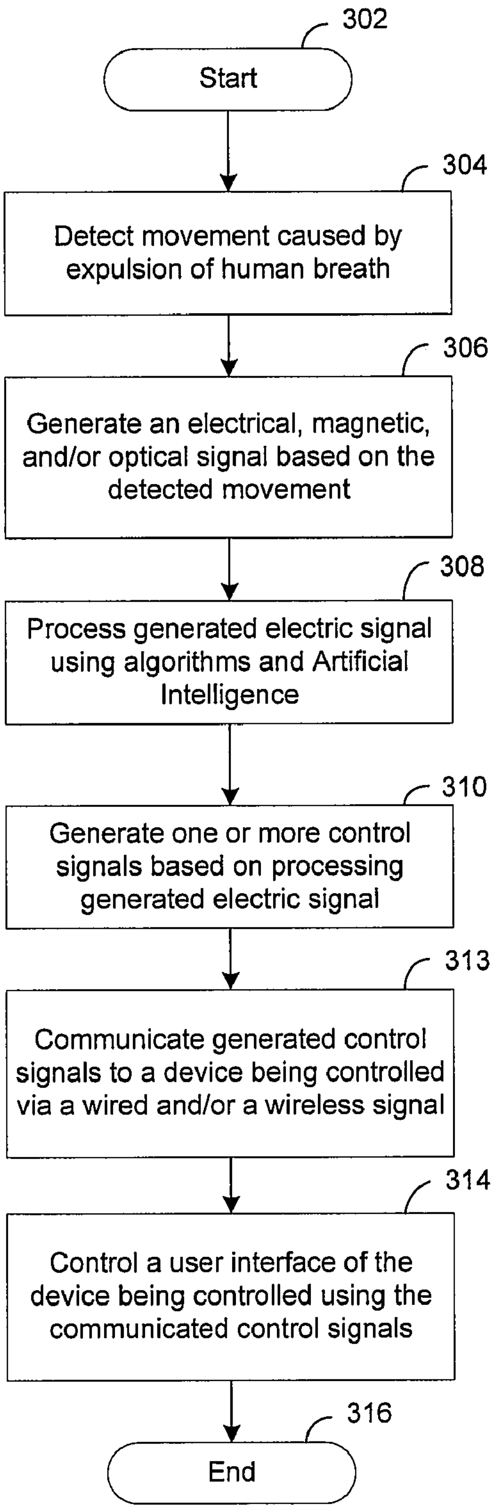
FIG. 3A is a flow chart illustrating exemplary steps for controlling a user interface of a device using human breath, in accordance with an embodiment of the invention.

FIG. 3A is a flow chart illustrating exemplary steps for controlling a user interface of a device using human breath, in accordance with an embodiment of the invention. Referring to FIG. 3A, exemplary steps may begin at step 302. In step 304, the sensing module 110 in the MEMS sensing and processing module 104 may be enabled to detect movement or change in composition such as ambient air composition, for example caused by the expulsion of human breath by the user 102. In step 306, the sensing module 110 may be enabled to generate one or more electrical, optical and/or magnetic signals in response to the detection of movement caused by the expulsion of human breath. In step 308, the processor firmware 116 may be enabled to process the received electrical, magnetic and/or optical signals from the sensing module 110 utilizing various algorithms. The processor firmware 116 may also be enabled to incorporate artificial intelligence (AI) algorithms to adapt to a particular user's 102 breathing pattern.

In step 310, the processor firmware 116 may be enabled to generate one or more control signals to the device being controlled 106 based on processing the received electrical, optical and/or magnetic signals from the sensing module 110. In step 312, the generated one or more control signals may be communicated to the device being controlled 106 via a wired and/or a wireless signal. In step 314, one or more processors within the device being controlled 106 may be enabled utilize the communicated control signals to control a user interface 128 of the device being controlled 106, such as a user interface 107*a* of the multimedia device 106*a*, a user interface 107*b* of the cellphone/smartphone/dataphone 106*b*, a user interface 107*c* of the personal computer (PC), laptop or a notebook computer 106*c*, a user interface 107*d* of the display device 106*d*, a user interface 107*e* of the TV/game console/other platform 106*e*, and a user interface of a mobile multimedia player and/or a remote controller. Control then passes to end step 316.

Figure 3B:
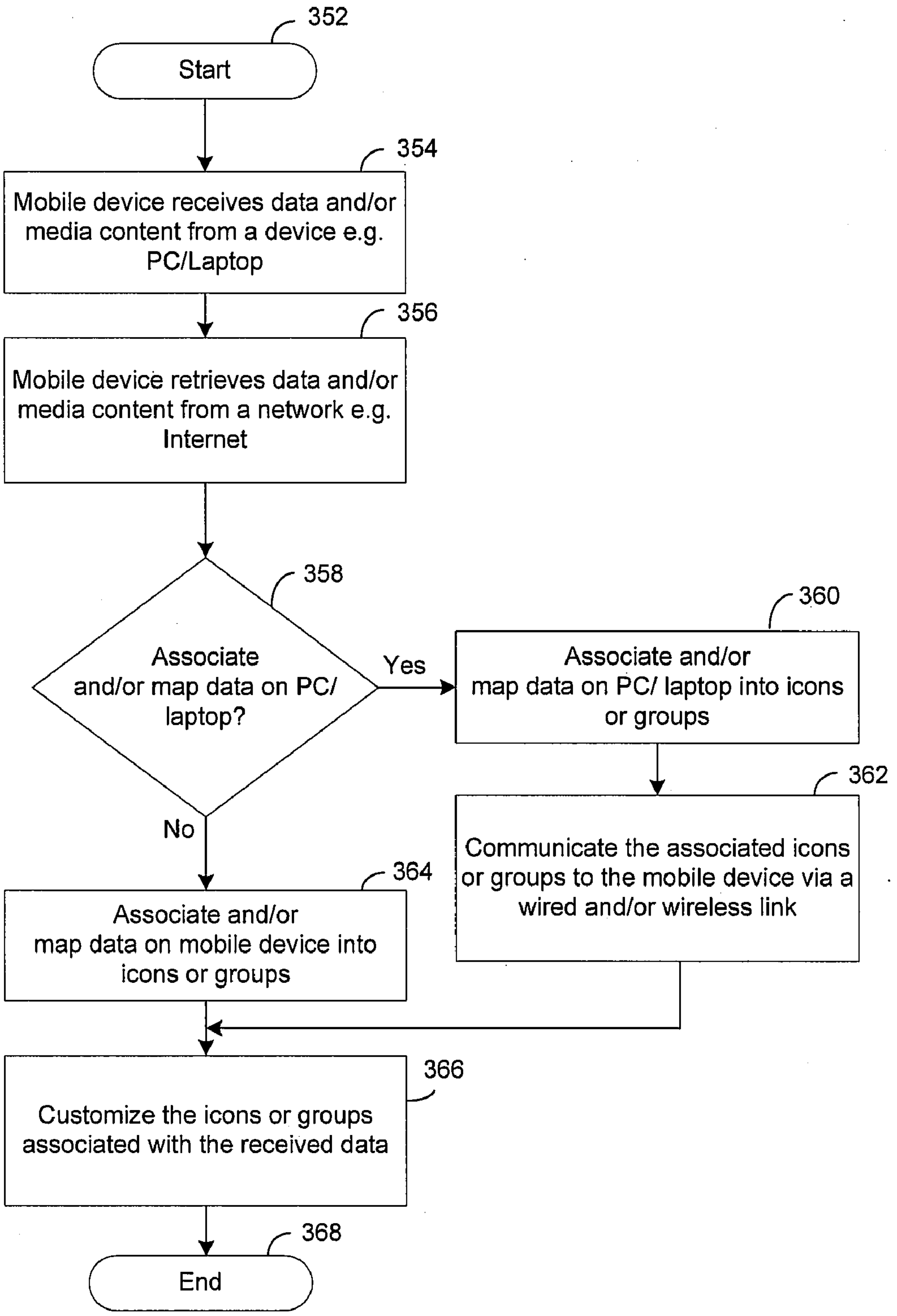
FIG. 3B is a flow chart illustrating exemplary steps for side loading of information, in accordance with an embodiment of the invention.

FIG. 3B is a flow chart illustrating exemplary steps for side loading of information, in accordance with an embodiment of the invention. Referring to FIG. 3B, exemplary steps may begin at step 352. In step 354, the device being controlled 106, such as the mobile phone 130*a* may be enabled to receive data and/or media content from another device 108, such as the PC, laptop, or a notebook computer 132. In step 356, the device being controlled 106, such as the mobile phone 130*a* may be enabled to retrieve data and/or media content from a network, such as the Internet 134. For example, the retrieved data and/or media content may comprise an RSS feed, a URL and/or multimedia content.

In step 358, it may be determined whether the laptop, PC and/or notebook 132 may perform association and/or mapping of the received data and/or media content and the retrieved data and/or media content. If the association or mapping is performed on the laptop, PC and/or notebook 132, control passes to step 360. In step 360, one or more processors within the laptop, PC and/or notebook 132 may be enabled to associate and/or map the received and retrieved data and/or media content into icons or groups. For example, the laptop, PC and/or notebook 132 may be enabled to associate and/or map an icon to a function so that the user 102 may enable or activate a function via the icon. Exemplary icons may enable functions such as hyper-links, book marks, shortcuts, widgets, RSS feeds and/or favorite buddies. In step 362, the laptop, PC and/or notebook 132 may be enabled to communicate the associated icons or groups to the device being controlled 106, such as the mobile phone 130*a*. Control then passes to step 366.

If the association or mapping is not performed on the laptop, PC and/or notebook 132, control passes to step 364. In step 364, one or more processors within the device being controlled 106, such as the mobile phone 130*a* may be enabled to associate and/or map the received and retrieved data and/or media content into icons or groups. For example, the mobile phone 130*a* may be enabled to associate and/or map an icon to a function so that the user 102 may enable or activate a function via the icon.

In step 366, the device being controlled 106, such as the mobile phone 130*a* may be enabled to customize the associated icons or groups so that content associated with the received data and/or media content may become an integral part of the user interface 131*a* of the device being controlled, such as the mobile phone 130*a*. The user interface 131*a* may be modified and/or organized by the user 102. In this regard, the user 102 may choose, create, arrange and/or organize content to be utilized for the user interface 131*a* and/or one or more content components. For example, the user 102 may organize the content components on a screen and may choose content such as personal photographs for background and/or icon images. In addition, the user 102 may create and/or modify the way content components are activated or presented to the user 102. For example, the user 102 may make, import and/or edit icons and/or backgrounds for the user interface 128. Control then passes to end step 368.

In accordance with an embodiment of the invention, a method and system for controlling a user interface of a device using human breath may comprise a MEMS sensing and processing module 104 that may be enabled to detect movement caused by the expulsion of human breath by the user 102. In response to the detection of movement caused by the expulsion of human breath, the MEMS sensing and processing module 104 may be enabled to generate one or more controls signals. The generated one or more control signals may be utilized to control a user interface 128 of a plurality of devices, such as a multimedia device 106*a*, a cellphone/smartphone/dataphone 106*b*, a PC, laptop or a notebook computer 106*c*, a display device 106*d*, a TV/game console/other platform 106*e*, a mobile multimedia player and/or a remote controller.

In an exemplary embodiment of the invention, the detection of the movement caused by the expulsion of human breath may occur without use of a channel. The detection of the movement caused by expulsion of human breath may be responsive to the human breath being exhaled into open space and onto a detection device or a sensing module 110 that enables the detection. The detecting of the movement and the generation of the one or more control signals may be performed utilizing a MEMS, such a MEMS sensing and processing module 104.

In accordance with another embodiment of the invention, the MEMS sensing and processing module 104 may be enabled to navigate within the user interface of one of more of the devices being controlled 106 via the generated one or more control signals. The MEMS sensing and processing module 104 may be enabled to select one or more components within the user interface 128 of the devices being controlled 106 via the generated one or more control signals. The generated one or more control signals may comprise one or more of a wired and/or a wireless signal.

In accordance with another embodiment of the invention, one or more of the plurality of devices, such as a handheld device, for example, a multimedia device 106*a* and/or a cellphone/smartphone/dataphone 106*b* and/or a PC, laptop or a notebook computer 106*c* may be enabled to receive one or more inputs defining the user interface 128 from another device 108. The other device 108 may be one or more of a PC, laptop or a notebook computer 106*c* and/or a handheld device, for example, a multimedia device 106*a* and/or a cellphone/smartphone/dataphone 106*b*. In this regard, data may be transferred from the other device 108 to the cellphone/smartphone/dataphone 106*b* and this data may be associated or mapped to media content that may be remotely accessed by the cellphone/smartphone/dataphone 106*b* via a service provider such as a cellular or PCS service provider. The transferred data that is associated or mapped to media content may be utilized to customize the user interface of the cellphone/smartphone/dataphone 106*b*. In this regard, media content associated with one or more received inputs may become an integral part of the user interface 128 of the device being controlled 106.

The invention is not limited to the expulsion of breath. Accordingly, in various exemplary embodiments of the invention, the MEMS may be enabled to detect the expulsion of any type of fluid such as air, and the source of the fluid may be an animal, a machine and/or a device.

Certain embodiments of the invention may comprise a machine-readable storage having stored thereon, a computer program having at least one code section for controlling a user interface of a device using human breath, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for interaction, the method comprising:

detecting movement caused by expulsion of human breath into open space; and responsive to said detection, generating one or more controls signals, wherein said generated one or more control signals are utilized to navigate within a user interface of a device and select components, and said detecting of said movement is performed by utilizing a detector which interacts with the user's breath without contacting the user directly.

2. The method according to claim 1, wherein said device comprises one or more of a personal computer (PC), a laptop, a notebook computer, a television (TV), a game console, a display device, and/or a handheld device.

3. The method according to claim 2, wherein said handheld device comprises one or more of a mobile telephone, a mobile multimedia player, navigation device and/or a remote controller.

4. The method according to claim 1, wherein said detecting of said movement caused by said expulsion of said human breath occurs without use of a channel.

5. The method according to claim 1, wherein said detecting of said movement caused by said expulsion of said human breath is responsive to said human breath being exhaled into said open space and onto one or more detectors that enables said detection.

6. The method according to claim 1, wherein said detecting of said movement and said generating of said one or more control signals are performed utilizing a micro-electro-mechanical system (MEMS).

7. The method according to claim 1, comprising selecting one or more components within said user interface via said generated one or more control signals.

8. The method according to claim 1, wherein said generated one or more control signals comprises one or both of a wired and/or a wireless signal.

9. The method according to claim 1, comprising receiving one or more inputs defining said user interface from another device.

10. The method according to claim 9, wherein said another device comprises one or more of a personal computer (PC), a laptop, a notebook computer and/or a hand held device.

11. The method according to claim 1, comprising customizing said user interface so that content associated with one or more received inputs becomes an integral part of said user interface.

12. A system for interaction, the system comprising:

one or more detectors operable to detect movement caused by expulsion of human breath into open space; and responsive to said detection, one or more circuits operable to generate one or more controls signals, wherein said generated one or more control signals are utilized to navigate within a user interface of a device and select components, and said one or more detectors operable to detect said movement interact with the user's breath without contacting the user directly.

13. The system according to claim 12, wherein said device comprises one or more of a personal computer (PC), a laptop, a notebook computer, a television (TV), a game console, a display device, and/or a handheld device.

14. The system according to claim 13, wherein said handheld device comprises one or more of a mobile telephone, a mobile multimedia player, a navigation device, and/or a remote controller.

15. The system according to claim 12, wherein said detecting of said movement caused by said expulsion of said human breath occurs without use of a channel.

16. The system according to claim 12, wherein said detecting of said movement caused by said expulsion of said human breath is responsive to said human breath being exhaled into said open space and onto said one or more detectors.

17. The system according to claim 12, comprising a micro-electro- mechanical system (MEMS), and wherein said MEMS comprises said one or more detectors and said one or more circuits.

18. The system according to claim 12, wherein said one or more circuits enables selection of one or more components within said user interface via said generated one or more control signals.

19. The system according to claim 12, wherein said generated one or more control signals comprises one or both of a wired and/or a wireless signal.

20. The system according to claim 12, wherein said one or more circuits enables receiving of one or more inputs defining said user interface from another device.

21. The system according to claim 20, wherein said another device comprises one or more of a personal computer (PC), a laptop, a notebook computer, and/or a handheld device.

22. The system according to claim 12, wherein said one or more circuits enables customization of said user interface so that content associated with one or more received inputs becomes an integral part of said user interface

* * * * *